J. G. SCHIFFER.
Malt-Driers.

No. 146,025.  Patented Dec. 30, 1873.

Witnesses.  Inventor.
John L. Boone  John G. Schiffer
C. M. Richardson.  per Dewey & Co Attys.

UNITED STATES PATENT OFFICE.

JOHN G. SCHIFFER, OF SAN FRANCISCO, CALIFORNIA.

IMPROVEMENT IN MALT-DRIERS.

Specification forming part of Letters Patent No. 146,025, dated December 30, 1873; application filed May 3, 1873.

*To all whom it may concern:*

Be it known that I, JOHN G. SCHIFFER, of San Francisco city and county, State of California, have invented an Improved Malt and Grain Drier; and I do hereby declare the following description and accompanying drawings are sufficient to enable any person skilled in the art or science to which it most nearly appertains to make and use my said invention or improvement without further invention or experiment.

My invention relates to an improved device for stirring and turning malt and other grain to be dried while it is being dried in a drying-kiln, in order to facilitate the drying and avoid manual labor in stirring it. My improvement consists of one or more rotary scoops and brushes so mounted and arranged as to be carried around inside of the kiln, and by their rotation be caused to lift and turn the grain or malt, and thus effectually stir it and expose it uniformly to the action of the heat.

In order to more fully illustrate and explain my invention, reference is had to the accompanying drawings forming a part of this specification, in which—

Figure 1:
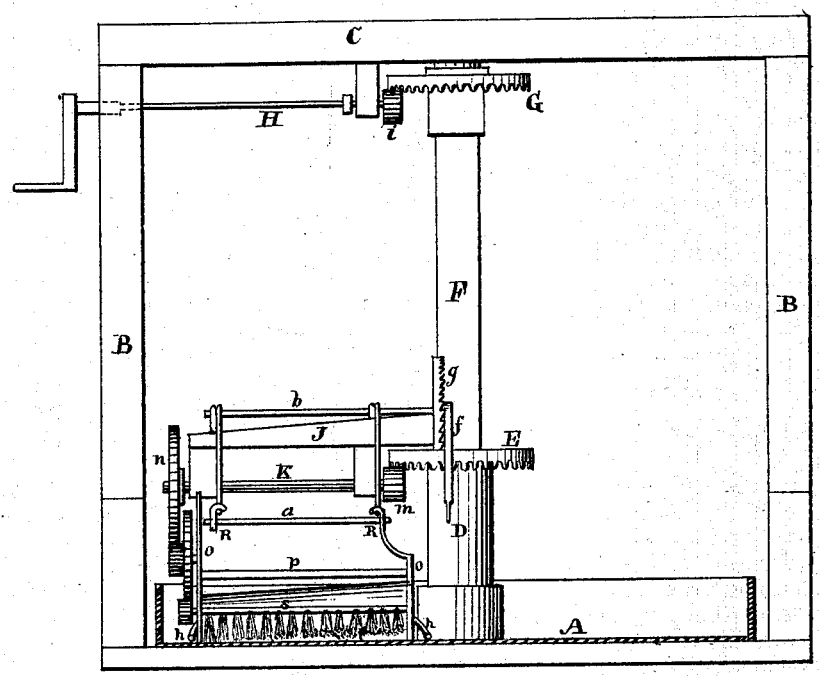
Figure 3:
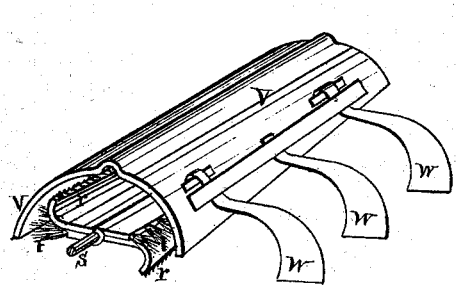
Figure 2:
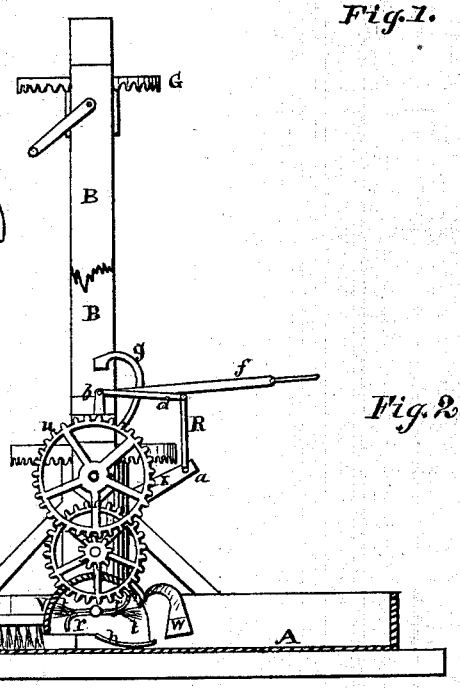

Figure 1 is a side elevation with section of pan, showing the stirrers. Fig. 2 is an end view of the stirrers and driving-gear. Fig. 3 is an enlarged perspective view of the stirrers.

Let A represent the circular floor of a drying-kiln. Directly over this floor I erect a frame having the two upright timbers B B and upper cross-timber C. In the center of the floor I secure an upright tube, D, having the horizontal crown-wheel E at its upper end, the cogs of which point downward. F is a vertical revolving shaft, the upper end of which bears against the under side of the cross-timber C, while its lower end enters the tube D through the center of the crown-wheel and steps in a suitable bearing. A crown-wheel, G, similar to the wheel E, is secured horizontally to the upper end of the shaft F. A shaft, H, is supported horizontally and at right angles to the upright shaft F, and carries at its inner end a pinion, *i*, which engages with the wheel G. Power is applied to the outer end of the shaft H, so as to drive the upright shaft F. Just above the horizontal crown-wheel E an arm, J, is secured to the upright shaft F, and extends out at right angles to it. A shaft, K, is supported horizontally in boxes, which are secured to the under side of the arm J, so that the shaft will be parallel with the arm. A pinion, *m*, on the inner end of this shaft engages with the teeth of the inverted crown-wheel E, while a spur-wheel, *n*, is secured to its outer extremity. A hanger, *o*, also depends from each end of the shaft K, and extends down close to the drying-floor, the hangers being supported in the proper relation to each other by a bracing-rod, *p*. The lifters and stirrers consist of two scoop-shaped pieces of metal, *r r*, which are secured to a shaft, *s*, so as to extend outward upon opposite sides of the shaft, and two brushes, *t t*, one of which is secured just back of each scoop. These scoops and brushes extend entirely across the floor from the center to the outside rim. The shaft *s* bears in the lower end of the hangers *o*, so that when it is revolved the scoops will take up the grain or malt and carry it over the shaft and deposit it upon the opposite side. The brushes are longer than the scoops, and serve, by brushing the floor after the scoops have passed, to flirt or hurl any portion of the grain or malt which may be left by the scoops ahead of the lifters, and thus prevent it from being buried. The shaft *s* is revolved by gearing from the spur-wheel *n* on the shaft K. A side or trail brush, *u*, is secured to the outer end of the traveling frame, which serves to draw in the grain from the outer edges of the floor. The gear-wheels which drive the stirrer are cased in to prevent the grain from clogging them. In order to prevent the scoops and brushes from scattering the grain, a shield or cover, V, is placed over them, so as to catch the grain and direct it upon the floor in rear of the stirrer. W W W are plow-shaped scrapers or levelers, which are attached to the case or shield V, so as to hang in the rear of the traveling stirrer. These scrapers serve to level the grain as it is dropped by the scoops, and prevent it from being deposited unevenly, or from being thrown mostly to the outer edge of the floor. The revolution of the upright shaft F will carry the arm J around in a circle, and consequently the engagement of the pinion *m* will cause the shaft K to revolve, and through it the rotary motion is given to the stirrers by means of the gearing. An arm, $x$, extends outward at an angle from each of the hangers $o$ upon one side, and the two arms are connected at their extremities by a rod, $a$. A shaft, $b$, is supported in boxes upon the arm J, parallel with the rod $a$. This shaft has two fixed arms, $d$, the extremities of which are connected with the rod $a$ by links R. A lever, $f$, is secured to the end of the rod $b$, which can be engaged with the teeth of a curved rack, $g$. By raising this lever and securing it on the rack, the entire stirring apparatus will be lifted clear of the grain, so that the floor can be cleared after the grain has been properly dried. A runner, $h$, is secured to the lower end of each hanger $o$, upon which the weight of the stirring machinery rests when the apparatus is let down, and upon which it travels when the machine is in motion. I thus provide a machine which will not only stir the grain, but will also turn it completely over, thus accomplishing what has heretofore required manual labor.

Having thus described my invention, what I claim, and desire to secure by Letters Patent, is—

1. The stationary central tube D, with its inverted crown-wheel E, and the upright revolving shaft F, with its arm J, in combination with the shaft K, with its pinion $m$ and spur-wheel $n$, hangers $o$, and revolving stirrer, all combined and arranged substantially as and for the purpose above described.

2. The shaft $s$, with its scoops $r$ $r$ and brushes $t$ $t$, in combination with the shield or cover V, substantially as and for the purpose above described.

3. The plow-shaped levelers or scrapers W W, in combination with the rotary scoops and brushes, substantially as and for the purpose described.

4. The hangers $o$, with their arms $x$, in combination with the shaft $b$, with its arms $d$, links R, pawl-lever $f$, and rack $g$, all combined and arranged substantially as and for the purpose above described.

In witness whereof I hereunto set my hand and seal.

JOHN GEORGE SCHIFFER. [L. S.]

Witnesses:
GEO. H. STRONG,
C. M. RICHARDSON.